United States Patent [19]

Rogers

[11] Patent Number: 4,823,492

[45] Date of Patent: Apr. 25, 1989

[54] EXPENDABLE EXPLOSIVE HEAD FOR SPEAR GUN

[75] Inventor: William H. Rogers, Jacksonville, Fla.

[73] Assignee: Sea Search, Inc., Jacksonville, Fla.

[21] Appl. No.: 211,764

[22] Filed: Jun. 27, 1988

[51] Int. Cl.[4] .................. A01K 81/04; A01K 81/00
[52] U.S. Cl. .................................... 43/6; 42/1.14; 102/371
[58] Field of Search ............... 43/6; 42/1.14; 102/371

[56] References Cited

U.S. PATENT DOCUMENTS 3,664,052  5/1972  Mounier ........................ 42/1.14
4,774,887 10/1988  Frain ............................. 43/6

Primary Examiner—Nicholas P. Godici
Assistant Examiner—Michael William Starkweather

[57] ABSTRACT

An expendable explosive accessory device to be placed on the forward tip of a spear for underwater fishing which includes a molded plastic outer tubular receiver having a forward closed end, a rearward open end, and an interior cavity to receive an explosive cartridge activated by a percussion cap in its base. An inner tubular receiver has a closed end positioned slidingly into the open end of the outer receiver behind the cartridge to waterproof seal the cartridge, and having an inner cavity adapted to receive the tip of a spear. A frictional ring means is provided to maintain all components in snug fitting relationship with each other and with the spear tip and a safety pin means is provided to prevent premature firing of the cartridge.

20 Claims, 2 Drawing Sheets

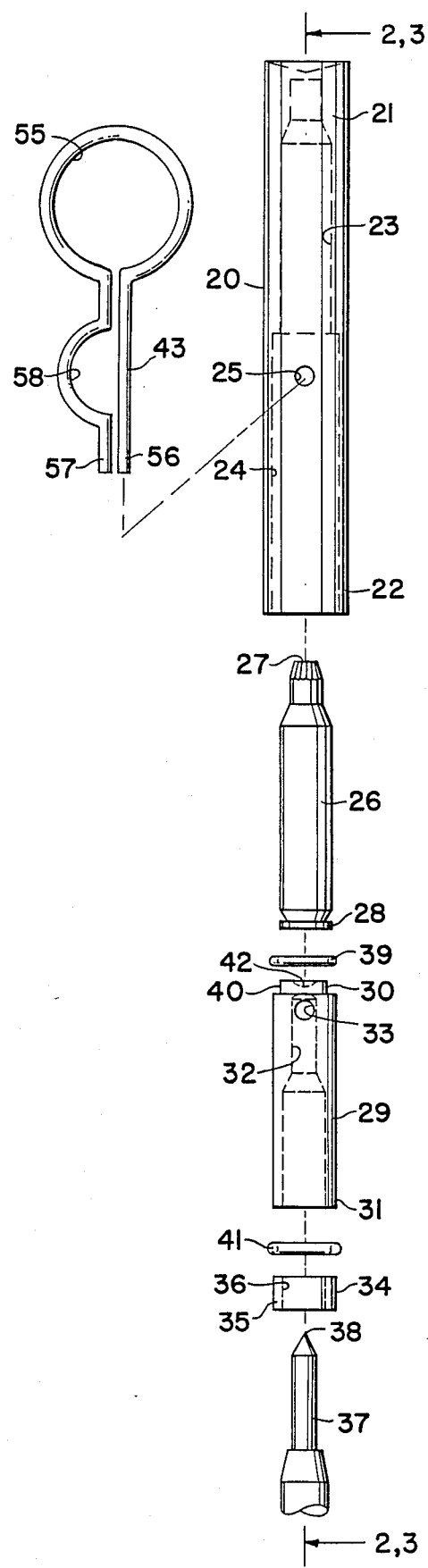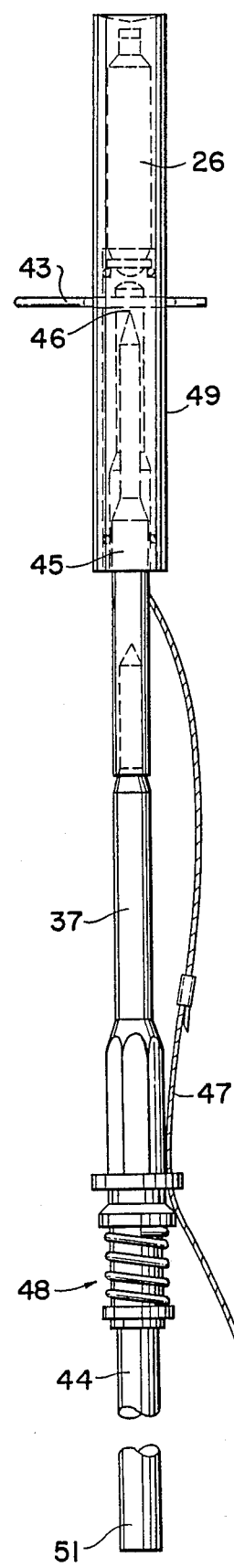

EXPENDABLE EXPLOSIVE HEAD FOR SPEAR GUN

BACKGROUND OF THE INVENTION

Spear guns are well known devices used by underwater swimmers and scuba divers to kill fish. There are larger fish, such as sharks, which may be encountered, and which are not easily killed by a spear. Because of the danger to the diver, there has been a need for a more potent weapon for defense against sharks. Available in the market today are devices to be screwed onto the forward end of a spear shaft in place of the pointed tip. The devices include a receiver to be loaded with a cartridge blank or a bullet, and a spring biased firing gun which moves forward by inertia when the spear hits the fish and strikes the percussion cap of the cartridge firing the head. The problems with this arrangement is that it is time consuming to remove a spear point and attach the prior art cartridge device. There may not be sufficient time to do this before the shark attacks. Furthermore, the firing pin mechanism and explosive charge are subject to corrosion and contamination by sea water under pressure by submersion by a diver, and may not function properly when needed.

It is an object of this invention to provide an improved expendable explosive head for a spear. It is another object of this invention to provide such a head that is substantially corrosion-proof and waterproof under normal diving circumstances that can be attached by merely placing it over a spear with a pointed tip without further operations. Still other objects will become apparent from the more detailed description which follows.

BRIEF SUMMARY OF THE INVENTION

This invention relates to an expendable explosive tip for an underwater spear gun which includes an elongated hollow cylindrical outer receptacle having a closed forward end and an open rearward end, with the forward end being adapted to receive a cartridge with its base percussion cap facing rearwardly. A hollow cylindrical inner receiver has a closed forward end and an open rearward end, with its rearward end being adapted to receive a tip of a spear gun spear to position the tip adjacent the forward end. The outside of the second receiver being slidable into the rearward end of the first receiver with its closed forward end of the second receiver being contiguous with the base of the cartridge.

In preferred embodiments of this invention, sealing means for waterproofing and corrosion proofing the cartridge is provided as well as frictional sealing means which are employed to maintain the component parts snugly against each other and snugly fitting onto the spear tip; and a safety pin device to prevent premature firing until a safety pin is removed.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is an exploded view of the expendable explosive head of this invention;

FIG. 4 is a side elevational view of the explosive head of this invention mounted on the forward tip of a spear.

DETAILED DESCRIPTION OF THE INVENTION

Figure 2:
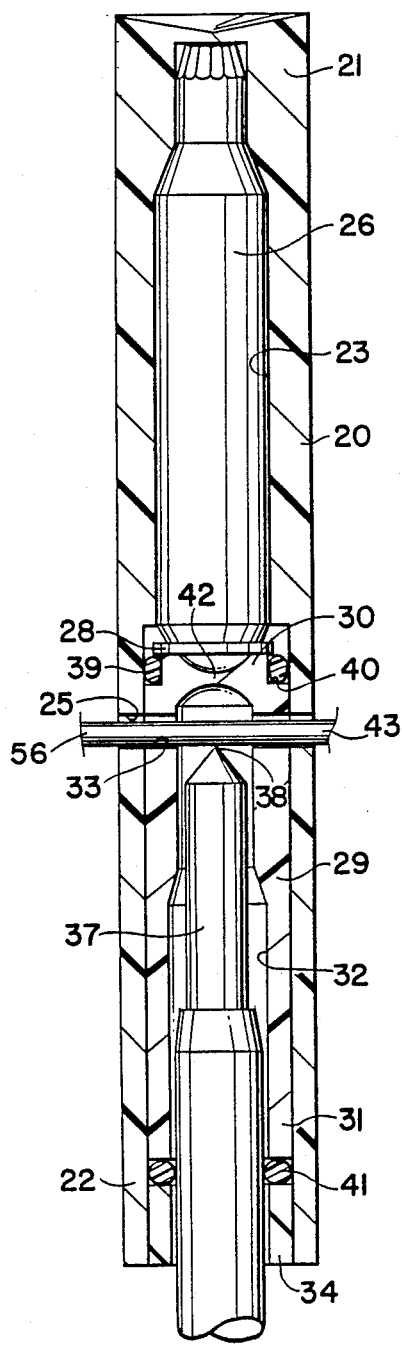
FIG. 2 is an enlarged cross-sectional view taken at 2—2 of FIG. 1 and showing the relationship of the component parts when first attached to the tip of a spear.

The various component parts of the expendable explosive head fabricated primarily of molded plastic parts in accord with this invention are shown in FIG. 1. An elongated tubular receptacle 20 is a housing for all of the remaining parts assembled and ready for attachment to the tip of a spear. The actual size of receptacle 20 is similar to a shotgun shell, although slightly larger, about ½ to ⅝ inch in diameter and about 4 inches long. Thus, it may be appreciated that several of such heads may easily be carried by the diver in a bag or loops in a belt worn by the diver.

Receptacle 20 is preferably an elongated hollow cylindrical tube or first outer receiver closed at its front end 21 and open at its back end 22. The inside cavity 23 is shaped adjacent front end 21 to receive an explosive cartridge 26, preferably cartridge 26 is blank since the concussion and explosive effects when hitting the fish are sufficient to kill. Cartridge 26 may be a bullet, if desired, in which event cavity 23 is shaped to receive the entire bullet in enclosed front end 21. The rear portion 24 of the cavity is shaped to receive snugly therein, spear receiver 29. Front end 30 of a second inner receiver 29 is positioned against base 28 of cartridge 26. Interior cavity 32 of receiver 29 is contoured to fit the forward tip 37 of a spear including the sharp point 38. Receiver 29 also has a closed front end 30 and an open back end 31 to define cavity 32. Behind receiver 29 is keeper 34 which has an interior surface 36 that fits snugly over spear tip 37 and an outer surface 35 which fits snugly within the cavity at back end 31 of receiver 29.

In order to hold all of the component parts closely together and to waterproof seal the cartridge from normal diving water pressure, it is preferable to provide frictional sealing means, most desirably exemplified by an elastic O-ring. O-ring 39 is shown seated on a flange 40 at front end 30 of spear receiver 29. This seal prevents water from entering cavity 23 when submerged in water under normal diving water pressures. Another elastic O-ring 41 is shown between back end 31 of receiver 29 and keeper 34. O-ring 41 fits snugly over tip 37 of the spear and keeps receptacle 20 and all of its internal component parts from falling off the spear.

Preferably, the cartridge 26 is appropriately dipped or coated to retard corrosion prior to assembly. Also a small amount of lubricant can be applied to make seating of the O-ring 39 easier, particularly while passing over the hole 25 extending through outer receptacle 20. Also a plastic glue is applied to the inner receiver 29 outside wall and to the keeper 34 outside wall to securely attach same in their proper positions within outer receiver 20 after keeper 34 is forcibly inserted therein and to further assure proper waterproofing of the cartridge.

The explosive in cartridge 26 is fired by point 38 of spear tip 37 hitting the percussion cap in the base 28 of cartridge 26. In order to prevent any premature firing of cartridge 26 a safety pin 43 is positioned in lateral aligned holes 25 and 33 in receptacle 20 and receiver 29, respectively, forming a passageway to receive safety pin 43. When the explosive head is in place on spear tip 37 and is ready to be fired, pin 43 is pulled out and may be thrown away. The safety pin 43 includes a finger pull 55, as shown in FIG. 1 terminating in generally parallel legs 56 and 57, leg 56 being straight and extending through the passageway formed by aligned holes 25 and 33 of the receivers 20 and leg 57 having a bulbous portion 58 to accommodate approximately one-half of the circumference of the outer receptacle 20 whereby the pin 43 is held in place until forcibly removed by a pulling force against finger pull 55 laterally away from receptacle 20, as would be commonly understood.

Figure 3:
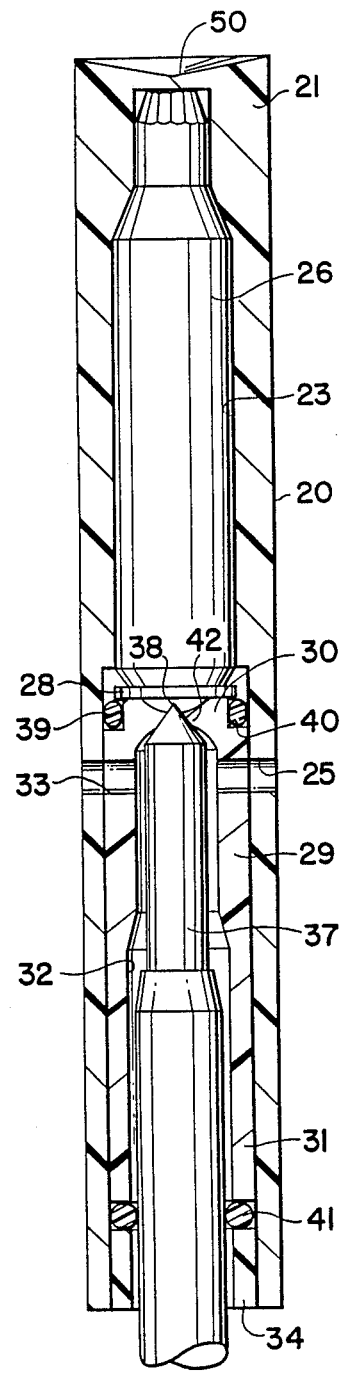
FIG. 3 is an enlarged cross-sectional view taken at 3—3 of FIG. 1 and showing the relationship of the component parts immediately after the spear is fired from the gun and before hitting the target fish.

The actual operation of the explosive head of this invention may be appreciated by viewing FIGS. 2 and 3. FIG. 2 represents the positions of all components when the head is stored or carried or when it is first placed on a spear tip 37. FIG. 3 represents the positions of the components when the spear has been fired from the gun and before it hits the shark.

IN FIG. 2 receptacle 20 has cartridge 26 in its cavity 23 positioned as far forward as possible with base 28 facing rearwardly. Spear receiver 29 is positioned snugly against base 28 of cartridge 26 and is as far forward as possible such that front end 30 is in contact with base 28. Safety pin 43 is positioned in aligned holes 25 and 33 to prevent point 38 of spear tip 37 from contacting the thin section 42 at front end 30. Spear tip 37 is as far forward as it can go in cavity 32 of spear receiver 29. Keeper 34 and O-ring 41 both fit snugly into cavity 32 and snugly around spear tip 37 with O-ring 41 providing some frictional engagement with the spear tip 37 to inhibit the device from inadvertently falling off same. In this condition the entire explosive head can be carried around and immediately placed onto a spear tip 37 to be as shown in FIG. 2.

IN FIG. 3 safety pin 43 has been pulled out, arming the explosive head for use. When the spear is fired toward the shark or other dangerous fish, point 38 of spear tip punctures the thin closure 42 but does not move further forward. The sudden impact of firing the spear and the resistance offered by blunt forward head 50 being pushed through the water causes the puncturing of closure section 42, but does not permit point 38 to move far enough forward to fire cartridge 26. The firing actually occurs when head 50 hits the fish, the momentum of the spear causing point 38 to move ahead and hit the percussion cap on the base 28 of cartridge 26. This is the preferred action so that the cartridge 26 can do as much damage to the fish as possible. Generally the explosion of a blank cartridge is sufficient to kill or fatally wound a large shark.

FIG. 5 shows the attachment of the explosive head 49 onto a spear equipped for spear fishing. Normally that spear 44 entails the shaft portion 51 and a tip 37 screwed to the front end of the shaft. In the preferred embodiment of co-pending U.S. patent application, Ser. No. 07/211,759 filed June 27, 1988, there also is an additional sharpened tip 45 with forward point 46 which slides over tip 37 and is attached to shaft portion 51 by a flexible cable 47 and a clamping means 48. This combination is particularly useful in spear fishing for small edible fish as described in such co-pending patent application. Should a dangerous shark suddenly appear, however, the diver need not change another special spear or make any adjustments to the fishing equipment except to apply an explosive head to the foremost point 46, pull pin 43 and fire at the shark. The rapidity with which the diver can prepare to defend himself from the shark is a key feature of this invention. Furthermore, the entire explosive head 49 is water tight around cartridge 26, and thus keeps the head ready for sure firing at all times. However, it is preferred that the additional tip 45 be removed and explosive head 49 be placed on the sharpened tip 37. Tip 37 normally will remain sharp because the additional sharpened tip 45 is used for spearing fish and the like and may be damaged by hitting rocks, etc. Thus misfiring of cartridge 26 is reduced due to the fact that the sharpened tip 37 will be sharp when used to cause the cartridge 26 to explode.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A molded plastic expendable head for an underwater spear gun comprising an elongated hollow cylindrical outer receptacle having a closed forward end and an open rearward end, said forward end being adapted to receive a cartridge with a base percussion cap facing rearwardly, a hollow cylindrical inner receiver having a closed forward end and an open rearward end, said rearward end being adapted to receive a tip of a spear gun spear to position a sharp point of a tip of a spear adjacent said forward end of said inner receiver, said inner receiver being slidable into said rearward end of said outer receptacle with said closed forward end of said inner receiver being contiguous with said base of said cartridge.

2. The explosive head of claim 1 wherein said outer receptacle and inner receiver include aligned holes forming a lateral passageway adjacent the forward end of said inner receiver adapted to receive a removable pin therethrough.

3. The explosive head of claim 1 further including seal means between an outside wall of said inner receiver and an inside wall of said outer receptacle to provide a water tight cavity therebetween under normal diving water pressures.

4. The explosive head of claim 3 wherein said seal means includes an O-ring positioned at said forward closed end of said second receiver.

5. The explosive head of claim 1 further including seal engaging means between said rearward end of said outer receptacle and a spear tip point and contiguous to said open rearward end of said inner receiver.

6. The explosive head of claim 5 wherein said seal engaging means includes an O-ring contiguous to said rearward end of said inner receiver and immediately rearward of and contiguous to said O-ring a short length of plastic tubing fitting snugly within around said spear tip and having an outside diameter which fits snugly into said rearward end of said first receiver.

7. The explosive head of claim 1 wherein said closed forward end of said receiver is pierceable by a point of a tip of a spear gun spear.

8. The explosive head of claim 7 wherein said forward end of said receiver inhibits the firing of said base percussion cap until said closed forward end of said receptacle hits a target.

9. An expendable cartridge firing accessory for optional addition to an underwater spear gun comprising an elongated hollow tubular first member having a front closed end a back open end, and an interior cavity; a hollow tubular second member having a front closed end, a back open end, and an interior cavity; said cavity of said first member having a front end contoured to receive an explosive cartridge with its projectile end adjacent said closed front end of said first member and its base with a percussion cap facing rearwardly, and having a back end contoured to receive said second member therein with said front end of said second member in contact with said base of said cartridge; said cavity of said second member being contoured to receive a forward tip including a sharp point of a spear of a spear gun; said closed front end of said second member being puncturable by a sharp point of a spear upon the forward movement of a spear upon firing of a spear gun, said forward movement being insufficient to cause firing of said percussion cap until said accessory hits a target.

10. The accessory of claim 9 further comprising a tubular keeper, said keeper being open at both ends and hollow and being adapted to fit closely around a tip of a spear and to fit snugly within said back open end of said second member to inhibit inadvertent removal of said second member from said first member.

11. The accessory of claim 9 further comprising an alignable lateral passageway generally medially through said first member and said front end of said second member, said passageway being adapted to receive a slidably removable safety pin which, when inserted through said passageway, prevents forward movement of a spear tip to puncture said closed front end of said second member.

12. The accessory of claim 9 further comprising an O-ring seal generally medially of said first member between said front end of said second member and said first member for waterproof sealing of said cartridge under normal diving water pressures.

13. The accessory of claim 10 further comprising an O-ring between said back end of said second member and said keeper which frictionally engages a tip of a spear to inhibit said accessory from inadvertent removal therefrom, said keeper being pressed towards said O-ring to cause the opening in said O-ring to be smaller than the opening of said back open end of said second member and the opening of said keeper.

14. The accessory of claim 9 wherein said first and second members are of molded plastic material.

15. The accessory of claim 9 wherein said first and second members are glued together to waterproof seal said cartridge therebetween under normal water diving pressures.

16. The accessory of claim 10 wherein said first and second members and keeper are of molded plastic material.

17. The accessory of claim 16 wherein said first and second members are glued together and said first member is glued to said keeper.

18. In combination an underwater spear for a spear gun and a molded plastic expendable explosive head comprising a spear having a forward tip and a sharp point, said head having an elongated hollow cylindrical outer receptacle having a closed forward end and an open rearward end, said forward end receiving a cartridge with a base percussion cap facing rearwardly, a hollow cylindrical inner receiver having a closed forward end and an open rearward end, said rearward end being adapted to receive said tip to position said sharp point adjacent said forward end of said inner receiver, said inner receiver being slidable into said rearward end of said outer receptacle with said closed forward end of said inner receiver being contiguous with said base of said cartridge.

19. The combination of claim 18 wherein said spear includes an elongated shaft, an elongated extension tip sharp at one of its ends and removably attached at its other end to said forward tip, an elongated flexible cable connected at one end to said extension tip, a releasable clamping means positioned on said shaft rearwardly of said tip for releasably holding said cable to shaft, said cable being taut to inhibit inadvertent removal of said extension tip from said forward tip during firing of said spear by a spear gun, said rearward end of said inner receiver being adapted to receive said extension tip therein to position its one end adjacent said forward end of said inner receiver in position to cause said base percussion cap to fire said cartridge upon impact with a target after said spear is fired from a spear gun.

20. The combination of claim 18 further comprising sealing means between said outer receptacle and said inner receiver for waterproofing said cartridge therebetween under normal diving water pressures.

* * * * *